Feb. 23, 1926.  
D. S. BEATTIE  
1,574,017  
VALVE  
Filed May 15, 1924

Daniel S. Beattie Inventor

By his Attorney
H. Phil

Patented Feb. 23, 1926.

1,574,017

UNITED STATES PATENT OFFICE.

DANIEL S. BEATTIE, OF NEW YORK, N. Y., ASSIGNOR TO NATHAN MANUFACTURING COMPANY, A CORPORATION OF NEW YORK.

VALVE.

Application filed May 15, 1924. Serial No. 713,410.

*To all whom it may concern:*

Be it known that I, DANIEL S. BEATTIE, a citizen of the United States, residing in the borough of Bronx, city, county, and State of New York, have invented certain new and useful Improvements in Valves, of which the following is a description.

This invention relates particularly to valves adapted to control the admission and flow of steam and similar fluids and has for its particular object an improved valve of simple and strong construction with novel characteristics of efficiency and durability. For brevity the word steam as hereinafter used will cover steam and fluids of similar characteristics. Because of these advantages of simplicity, strength and durability, valves embodying my invention can be economically manufactured in large quantities. The essential characteristices of my invention are apparent from the embodiment thereof described herein and disclosed in the accompanying drawings.

Figure 1:
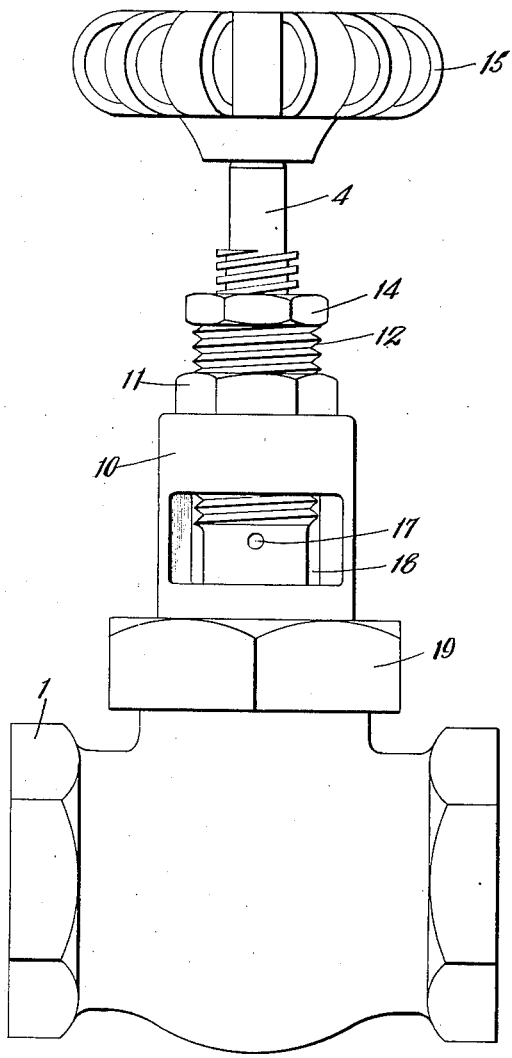
Figure 2:
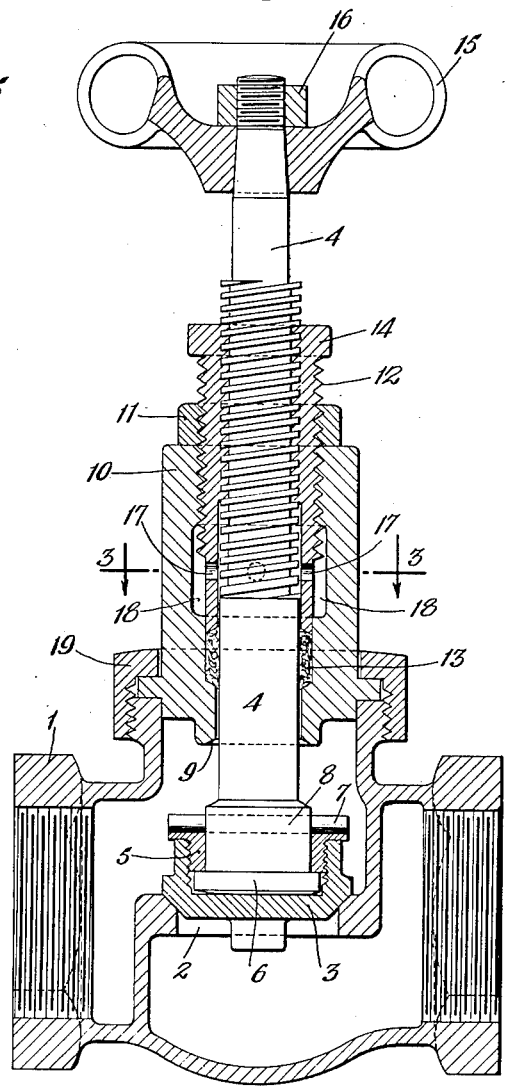
Figure 3:
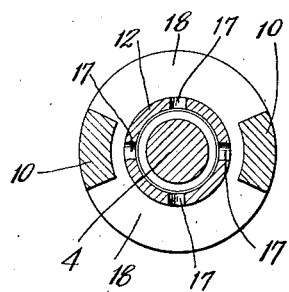

Fig. 1 is a side elevation and Fig. 2 is a central vertical section of a valve structure embodying my invention. Fig. 3 is a cross section on the line 3—3 of Fig. 2.

In the drawings the valve casing 1 with inlet and outlet passages contains port 2 closable by valve disc 3. This disc is attached to the valve spindle 4 by nut 5 threaded into the disc and thereby holding the flange 6 of the spindle. Pin 7 is passed through a slot in nut 5 and through an enlarged lower part 8 of spindle 4 to enable regrinding in the usual manner well known to the art. Lower part 8 is adapted to contact with shoulder 9 of a bonnet 10 when port 2 is opened by valve disc 3 being withdrawn upwards. The bonnet is interiorly threaded to receive an exteriorly threaded packing gland 12, secured by locknut 11. Chamber 13 in bonnet 10 contains suitable packing material, which may be compressed by downward movement of the gland, preferably caused by application of a wrench to the hexagonally formed upper part 14 of the gland.

Gland 12 is interiorly threaded to receive exteriorly threaded spindle 4 which is readily rotatable by means of its hand wheel 15 secured to the spindle by nut 16. Gland 12 contains passages 17 from the space between it and the close fitting spindle to rectangular openings 18 in bonnet 10. Preferably, as shown, the lowest point of the threads on the spindle is above the passages 17 when the valve is open. Bonnet 10 is secured to casing 1 by nut 19.

To open the valve, spindle 4 is rotated by hand wheel 15, thereby raising valve disc 3 from its seat on port 2 until lower part 8 of the spindle contacts with shoulder 9 of bonnet 10. It will be noted that in this position steam passing through the valve should not reach the packing. If the contact between lower part 8 and shoulder 9 should be such as to allow steam to pass upwards from the valve, such steam will not reach and injuriously affect the threads on the spindle, even if it should pass the packing, as the steam will escape to the atmosphere through passages 17 and openings 18. The very harmful effects of steam under pressure upon wearing parts, especially threads, are thus prevented, thereby lengthening the life of the valve and avoiding frequent repairs and replacements. To close the valve, the spindle is rotated by means of its hand wheel until the valve disc 3 seats upon and closes port 2 between the inlet and outlet passages.

The embodiment of my invention herein described is merely illustrative, various modifications and changes being possible without departing from the substance of the invention herein described and claimed. For example, my invention may be employed in a stuffing box assembly instead of a valve assembly, the following claims defining the nature of my invention.

What I claim is:

1. In a valve assembly, a casing with bonnet secured therein; a packing gland movable within the bonnet; a threaded spindle movable within the gland; packing between gland and spindle; passages in gland; and openings in bonnet, the space between spindle and gland communcating with the atmosphere by means of such passages and openings.

2. In a valve assembly, a threaded bonnet; a threaded packing gland within such bonnet; a threaded spindle within the gland; packing between gland and spindle, the space between spindle and gland communicating directly with the atmosphere.

3. In a valve assembly, a movable packing gland within the valve casing; a threaded spindle movable within the gland; and passages in the gland between the spindle and atmosphere, the threads on said spindle being above said passages when the valve is open.

4. In a valve assembly, a spindle with threaded portion outside of the steam passages; packing between the threaded portion and the steam passages; and atmospheric communication located between the threaded portion and the packing.

5. In a valve assembly, an interiorly threaded gland; an exteriorly threaded spindle movable therein; a packing chamber between the threaded portions of gland and spindle and the valve chamber, the packing wherein is compressed against the spindle by the gland alone; and atmospheric communicating means located between the threaded portion of the gland and the packing, and communicating with the space between the gland and spindle.

6. In a valve assembly, an interiorly threaded gland; an exteriorly threaded spindle movable therein; and a packing chamber between the threaded portions of gland and spindle and the valve chamber, the space between the gland and spindle communicating directly with the atmosphere.

7. In combination, a chamber; an interiorly threaded gland; an exteriorly threaded spindle movable therein; a packing chamber between the threaded portions of gland and spindle and the chamber; and passages in the gland between the spindle and atmosphere, the threads on said spindle being above said passages when the valve is open.

8. In a stuffing box assembly, a chamber; a spindle with threaded portion outside of said chamber; packing between the threaded portion and the chamber; and atmospheric communication located between the threaded portion and the packing.

DANIEL S. BEATTIE.